(12) United States Patent
Kipping et al.

(10) Patent No.: US 7,856,894 B2
(45) Date of Patent: Dec. 28, 2010

(54) DEVICE FOR MEASURING THE STRIP TENSION IN A METAL STRIP

(75) Inventors: Matthias Kipping, Herdorf (DE); Matthias Tuschhoff, Siegen (DE); Martina Ebenbeck, Hilchenbach (DE); Heinz Niehues, Hilchenbach (DE)

(73) Assignee: SMS Siemag Aktiengesellschaft, Dusseldorf (DE)

( * ) Notice: Subject to any disclaimer, the term of this patent is extended or adjusted under 35 U.S.C. 154(b) by 258 days.

(21) Appl. No.: 12/083,752

(22) PCT Filed: Sep. 3, 2007

(86) PCT No.: PCT/EP2007/007659

§ 371 (c)(1),
(2), (4) Date: Apr. 19, 2008

(87) PCT Pub. No.: WO2008/046470

PCT Pub. Date: Apr. 24, 2008

(65) Prior Publication Data

US 2009/0139350 A1   Jun. 4, 2009

(30) Foreign Application Priority Data

Oct. 21, 2006   (DE) ........................ 10 2006 049 744
Dec. 15, 2006   (DE) ........................ 10 2006 059 244

(51) Int. Cl.
*G01L 1/04* (2006.01)

(52) U.S. Cl. ................................. 73/862.451

(58) Field of Classification Search ............ 73/862.451, 73/600, 159
See application file for complete search history.

(56) References Cited

U.S. PATENT DOCUMENTS

| 3,233,884 | A | * | 2/1966 | Laine .......................... 266/112 |
| 3,307,015 | A | * | 2/1967 | Hagiwara .................... 219/155 |
| 4,004,459 | A | | 1/1977 | Greenberger |
| 6,070,472 | A | * | 6/2000 | Kipping et al. ............... 73/829 |
| 6,192,765 | B1 | * | 2/2001 | Kipping et al. .......... 73/862.55 |
| 2002/0080851 | A1 | | 6/2002 | Faure et al. |

FOREIGN PATENT DOCUMENTS

| DE | 37 21 746 | 1/1989 |
| DE | 197 04 447 | 8/1998 |
| DE | 197 32 862 | 2/1999 |
| DE | 199 18 699 | 11/2000 |
| DE | 1 464 416 | 10/2004 |
| WO | 01/05530 | 1/2001 |

* cited by examiner

*Primary Examiner*—Lisa M Caputo
*Assistant Examiner*—Octavia Davis
(74) *Attorney, Agent, or Firm*—Lucas & Mercanti, LLP; Klaus P. Stoffel

(57) ABSTRACT

The invention concerns a device (1) for measuring the strip tension in a metal strip, especially a steel strip, which device has a flat, level table (2), over which the metal strip can run and at one end (3) of which a plurality of measuring elements (4) is mounted, which are suitable for measuring the strip tension, where cooling elements (5) are provided, which are installed under the table (2) and with which cooling liquid, especially water, can be carried into the area of the measuring element (4). In order to secure the table against sagging in a simple way, the invention provides that the cooling elements (5) have a box-like cooling liquid tank (6), which is arranged on both sides of the metal strip on at least one support member, such that the underside of the table (2) rests directly or indirectly on the box-like cooling liquid tank (6).

9 Claims, 3 Drawing Sheets

DEVICE FOR MEASURING THE STRIP TENSION IN A METAL STRIP

BACKGROUND OF THE INVENTION

The invention concerns a device for measuring the strip tension in a metal strip, especially a steel strip, which device has a flat, level table, over which the metal strip can run and at one end of which a plurality of measuring elements is mounted, which are suitable for measuring the strip tension, where cooling elements are provided, which are installed under the table and with which cooling liquid, especially water, can be carried into the area of the measuring elements.

Devices of this general type for measuring the state of flatness, especially of a rolled strip that is under tension, are already known. A measuring roller, which is pressed against the underside of the strip, which passes over the table in a direction of conveyance, is usually used as the measuring element. The strip tension can be derived from the measured deflection of the measuring roller in the direction normal to the surface of the strip.

One also speaks of a looper or a tension meter looper in connection with devices of this general type.

Devices of the aforementioned type are described in DE 37 21 746 C2, DE 197 04 447 A1, DE 199 18 699 A1, and U.S. Pat. No. 4,004,459.

FIG. 1 shows a previously known embodiment of a device 1 of this general type for measuring strip tension. The drawing in FIG. 1 is a cross-sectional side view of the device. The metal strip (not shown) passes through the device 1 from left to right, and the strip is in contact with the upper surface of the table 2 (guide table). On the front edge 3 of the table there are a number of measuring rollers 4, which are supported by a frame 12 on a measuring sensor 14. Due to the temperature of the strip to be processed and measured, the measuring roller 4 must be cooled. For this purpose, cooling elements 5 are provided, i.e., pipelines that are supplied with water from a water source. The pipelines terminate in cooling liquid discharge orifices 9, through which the water reaches the measuring roller 4.

This previously known embodiment of a device of this type for measuring strip tension has the following disadvantages: The pipelines 5 run under the table 2 to the measuring roller 4. In this connection, the table 2 is supported on a support member (support frame) on each of its two sides or edges (as seen in the direction of strip travel). For structural reasons, a low overall height of the table is necessary in order to have sufficient room under the table for the cooling water pipes and the other components of the structure. As a result, the table is not provided with sufficient strength, and, due to mechanical and thermal stress, it can sag to such an extent that the function of the measurement system installed under the table for determining the deflection of the measuring roller is disturbed.

SUMMARY OF THE INVENTION

Therefore, the objective of the invention is to modify a device of the aforementioned type in such a way that these disadvantages are avoided. The device for measuring the strip tension should thus be refined in such a way that the table is secured against sagging in a simple way. Accordingly, especially the measurement system should be made insusceptible to mechanical and thermal stresses of the table and thus insusceptible to its deformations.

In accordance with the invention, this objective is achieved by virtue of the fact that the cooling elements have a flexurally stiff box-like cooling liquid tank, which is arranged on both sides of the metal strip on at least one support member each, such that the underside of the table rests directly or indirectly on the box-like cooling liquid tank.

Instead of being supported for itself on the sides, in accordance with the invention, the table is placed directly or with suitable spacers on the box-like cooling liquid tank, which has the consequence that much greater resistance to sagging of the table is obtained.

In accordance with this refinement, to realize further improvement, the box-like cooling liquid tank is constructed as a hollow rectangular body. It can be constructed by joining flat plates, especially by soldering or welding. However, it is also possible for it to be produced from one or more flat plates by bending up the edges of the plate, such that, if necessary, two or more bent plates can be joined (welded, soldered).

It is advantageous for the box-like cooling liquid tank to have a number of cooling liquid discharge orifices along its underside. It preferably has a cooling liquid feed line along each of its two transverse sides.

The two cooling liquid feed lines can be formed on the transverse sides of the cooling liquid tank to allow lateral mounting of the cooling liquid tank on the one or more support members.

The measuring element is preferably a measuring roller of a type that is already well known in itself. It is especially preferred that the device is part of a looper in a finishing stand of a rolling mill. The proposal of the invention is preferably used in loopers in finishing stands in hot wide strip mills and in CSP (compact strip production) plants.

The modification of the invention makes it possible to avoid deformation of the table and thus to obtain better protection of the measuring elements from external effects of the segment frames and the table. The proposed box-like cooling liquid tank acts as a barrier in case of deformation, so that deformation of the table can be prevented.

Vertical forces on the table are thus better absorbed by the box-like cooling liquid tank and are unable to act on the measuring elements.

Therefore, the box-like cooling liquid tank takes on the function of supplying the cooling water to the measuring rollers of the tensiometer or the tensiometer looper and the function of supporting the table. The specifically proposed design of the cooling liquid tank provides it with a high degree of strength and thus a high degree of resistance to sagging forces.

BRIEF DESCRIPTION OF THE DRAWING

A specific embodiment of the invention is illustrated in the drawings.

DETAILED DESCRIPTION OF THE INVENTION

Figure 1:
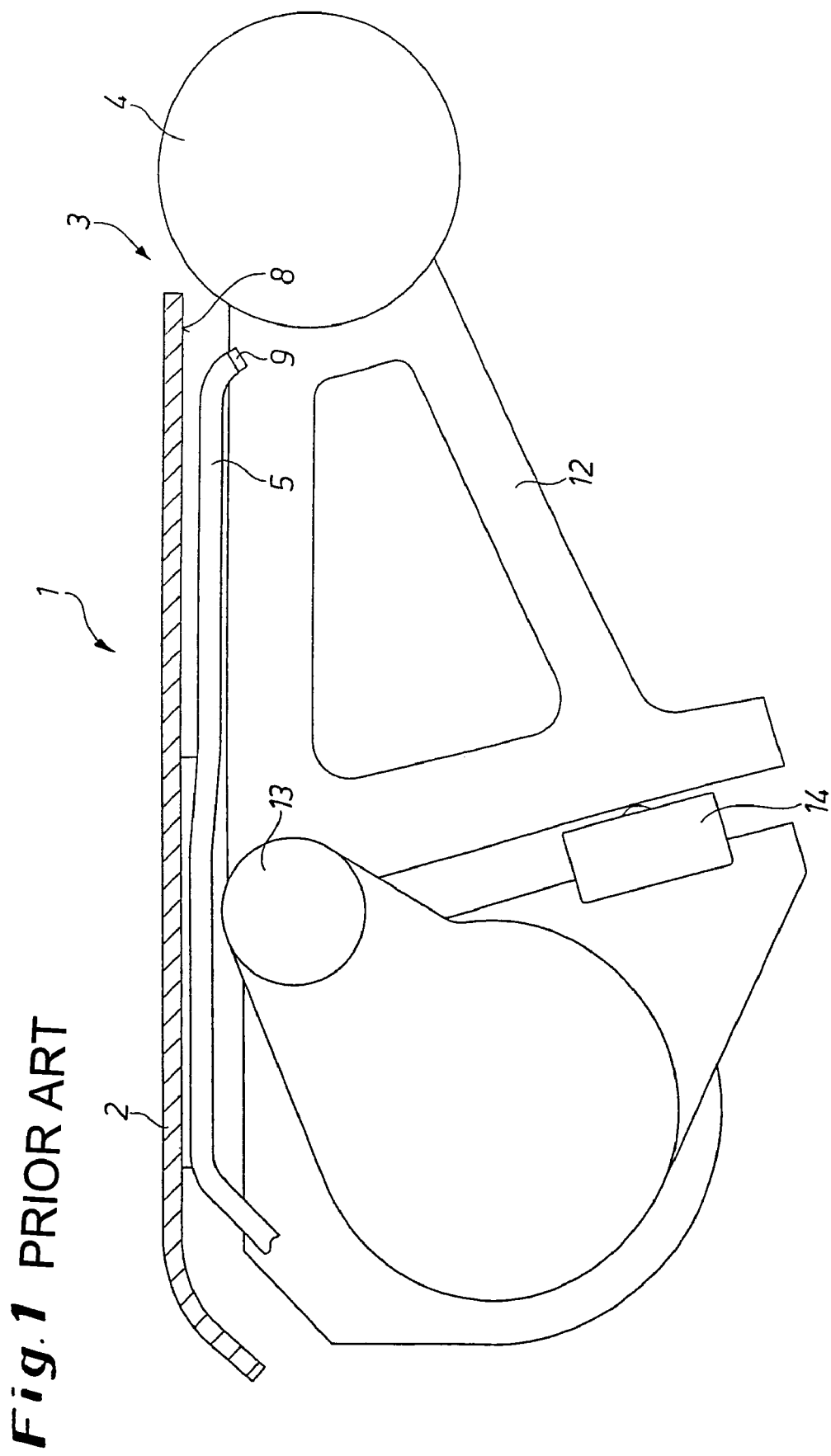
FIG. 1 shows a cross-sectional side view of a prior-art device for measuring strip tension.
Figure 2:
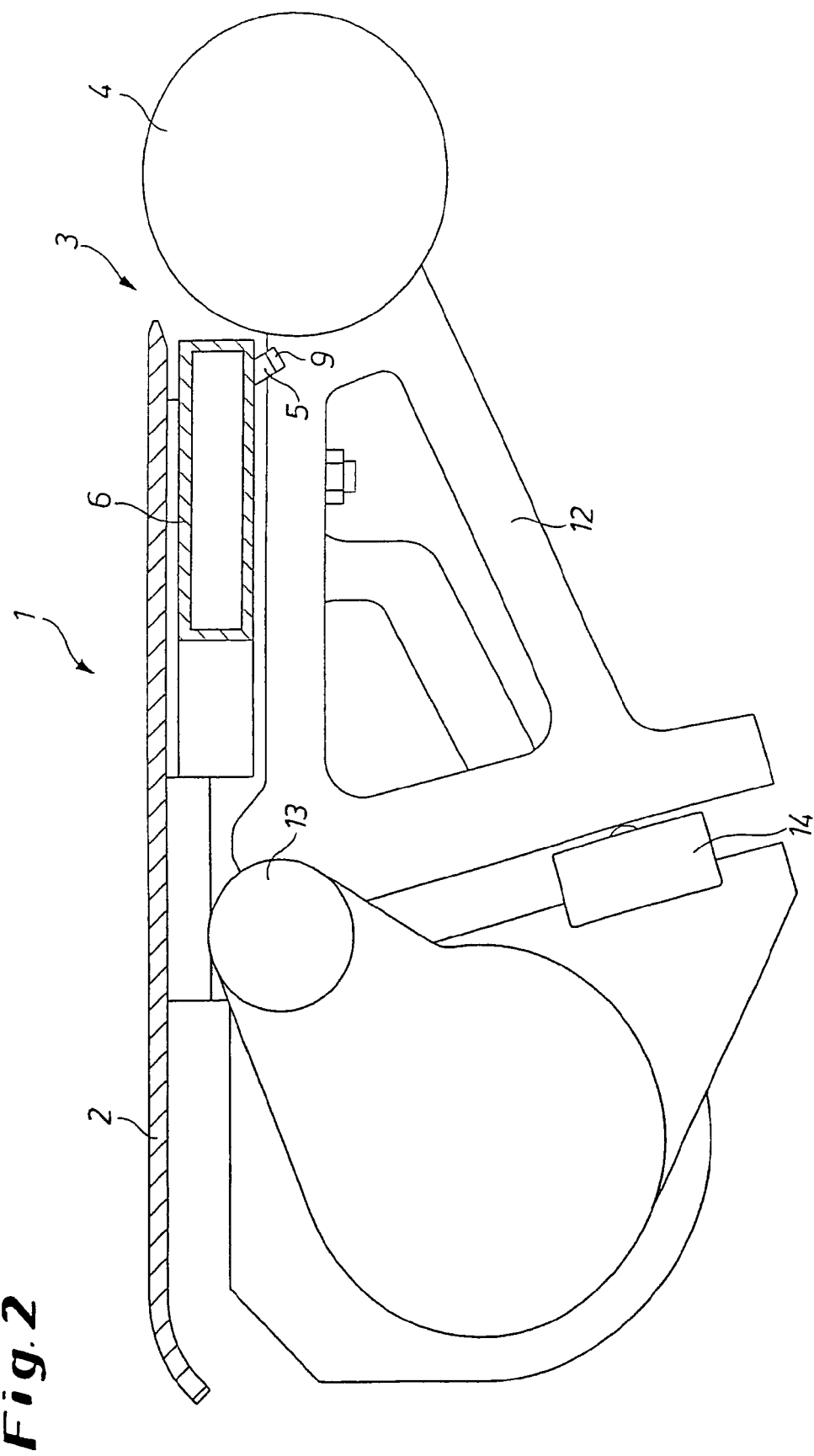
FIG. 2 shows a side view of the device for measuring strip tension in accordance with the invention.

The drawings show a device 1 for measuring the strip tension of a steel strip; the strip itself is not shown. The strip passes over a table 2 in its direction of conveyance, which forms a flat surface on which the strip rests. Measuring elements in the form of measuring rollers 4 are arranged at the front edge 3 of the table. Each of the measuring rollers is arranged at one end of a arm 12, which is supported in a bearing 13. One end of the arm 12 presses on a measuring sensor 14, so that it can be determined how far downward the measuring roller 4 is pushed due to the tension in the strip. This makes it possible for the measuring element 4, 12, 14 to measure the strip tension.

Since the strip passing over the table is hot, it is necessary to provide sufficient cooling of the measuring roller 4. For this purpose, cooling elements 5 are provided, which extend from a cooling water source (not shown) to cooling liquid discharge orifices.

In accordance with the invention, the cooling elements 5 consist of a box-like cooling liquid tank 6, which is installed below the table 2 and rests against the table 2 (see FIG. 3).

The cooling liquid tank 6 (seen best in FIG. 3) has a rectangular contour and on its underside 8 it has a number of cooling liquid discharge orifices 9, by which the cooling water is carried to the measuring roller 4. The cooling liquid tank 6 is fed with cooling water by two cooling liquid feed lines 11 arranged on the transverse sides 10.

Figure 3:
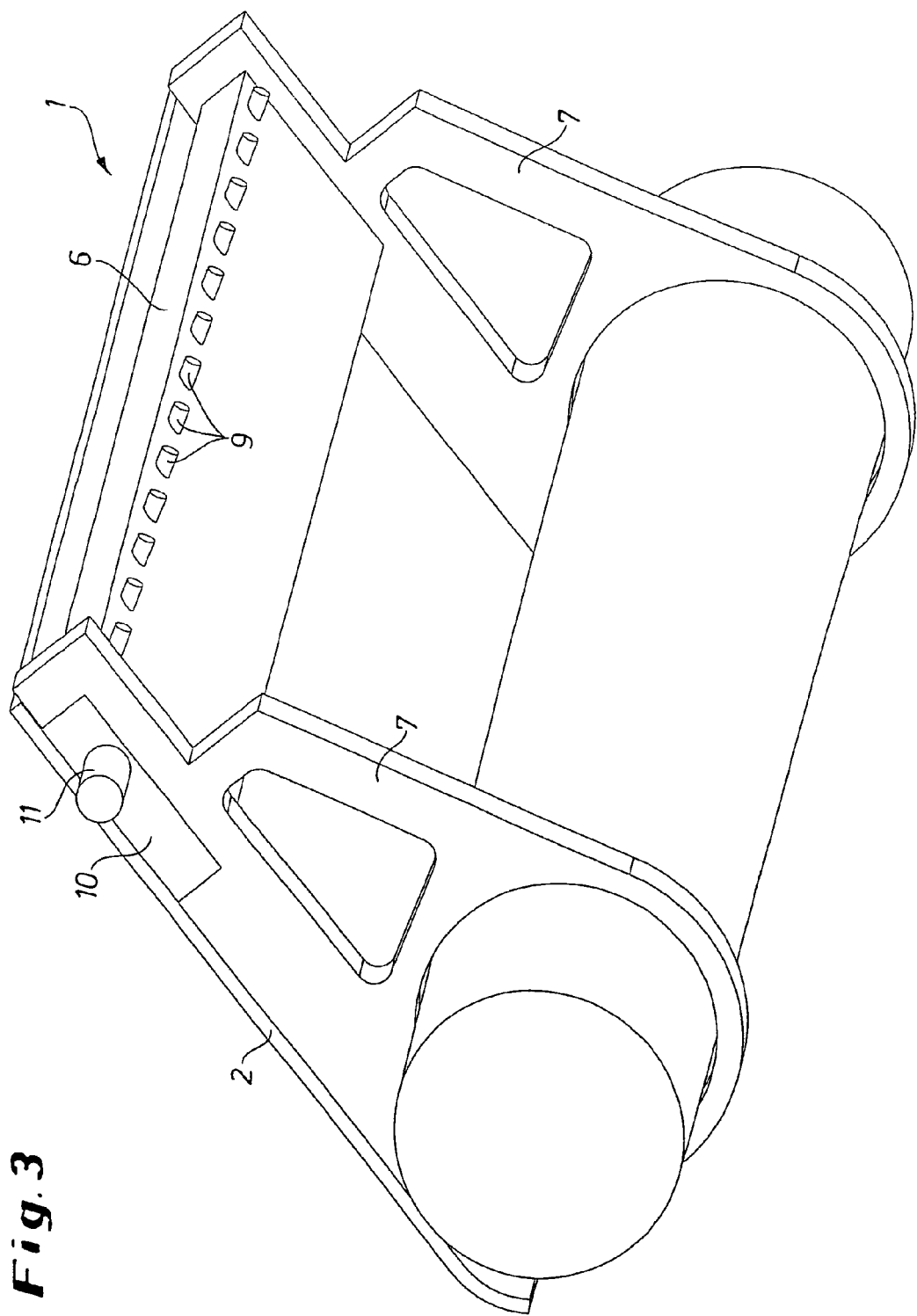
FIG. 3 shows a perspective view from below of the box-like cooling liquid tank of the device for measuring strip tension in accordance with the invention.

As is again shown best in FIG. 3, the box-like cooling liquid tank 6 is laterally supported on support members 7, which are formed by the surrounding parts of the device 1. As a result of the design of the cooling liquid tank 6 as a rectangular solid, the tank has a high section modulus against bending. This has the effect that the table lying on the cooling liquid tank is optimally supported, and when mechanical or thermal loads act on the table, combined with corresponding sagging, the sagging cannot penetrate as far as the measuring sensor 14, but rather the table 2 is firmly supported on the cooling liquid tank 6, so that even at high loads, there is no need to fear relevant effects that could adversely affect the results of the measurement of the strip tension.

LIST OF REFERENCE NUMBERS

1 device for measuring the strip tension
2 table
3 front edge of the table
4 measuring roller
5 cooling element
6 box-like cooling liquid tank
7 support member
8 underside of the table
9 cooling liquid discharge orifice
10 transverse side
11 cooling liquid feed line
12 arm
13 bearing
14 measuring sensor

The invention claimed is:

1. A device (1) for measuring the strip tension in a horizontal metal strip, especially a steel strip, which device has a flat, level table (2), over which the metal strip can run and at one end (3) of which a plurality of measuring elements (4) is mounted, which are suitable for measuring the strip tension, where cooling elements (5) are provided, which are installed under the table (2) and with which cooling liquid, especially water, can be carried into the area of the measuring element (4), wherein the cooling elements (5) have a flexurally stiff box-like cooling liquid tank (6), which is arranged on both sides of the metal strip on at least one support member (7) each, such that the underside of the table (2) rests directly or indirectly on the box-like cooling liquid tank (6).

2. A device in accordance with claim 1, wherein the box-like cooling liquid tank (6) is constructed as a hollow rectangular body.

3. A device in accordance with claim 1, wherein the box-like cooling liquid tank (6) is constructed by joining flat plates.

4. A device in accordance with claim 1, wherein the box-like cooling liquid tank (6) is produced from one or more flat plates by bending up the edges of the plate.

5. A device in accordance with claim 1, wherein the box-like cooling liquid tank (6) has a number of cooling liquid discharge orifices (9) along its underside (8).

6. A device in accordance with claim 1, wherein the box-like cooling liquid tank (6) has a cooling liquid feed line (11) along each of its two transverse sides (10).

7. A device in accordance with claim 1, wherein the measuring element (4) is a measuring roller.

8. A device in accordance with claim 1, wherein the device is part of a looper in a finishing stand of a rolling mill.

9. A device in accordance with claim 8, wherein the rolling mill is a hot wide strip mill or a CSP (compact strip production) plant.

* * * * *